(12) United States Patent
Huetter (10) Patent No.: US 6,648,200 B2
(45) Date of Patent: Nov. 18, 2003

(54) MAGNETIC-TAPE APPARATUS WITH A PRESSURE-ROLLER DEVICE AND PRESSURE-ROLLER UNIT

(75) Inventor: Heinrich Huetter, Tulln (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/086,734

(22) Filed: Mar. 1, 2002

(65) Prior Publication Data
US 2002/0125289 A1 Sep. 12, 2002

(30) Foreign Application Priority Data
Mar. 6, 2001 (EP) .............................. 01890063

(51) Int. Cl.[7] ........................ B65H 20/00; F16C 23/08
(52) U.S. Cl. ........................ 226/194; 226/186; 384/196; 384/203
(58) Field of Search ................................ 226/186, 187, 226/190, 194; 384/196, 203, 206

(56) References Cited

U.S. PATENT DOCUMENTS

| 3,662,937 A | * | 5/1972 | Borman | 226/194 |
| 4,403,720 A | * | 9/1983 | Grant | 226/190 |
| 4,518,134 A | * | 5/1985 | Oishi et al. | 226/194 |
| 4,770,550 A | * | 9/1988 | Takahashi | 226/194 |
| 5,373,982 A | * | 12/1994 | Takahashi | 226/194 |
| 5,452,833 A | | 9/1995 | Hutter | 226/194 |
| 5,803,336 A | * | 9/1998 | Kim | 226/194 |
| 5,833,125 A | * | 11/1998 | Shin | 226/194 |
| 6,419,139 B1 | * | 7/2002 | Shibata et al. | 226/194 |

* cited by examiner

*Primary Examiner*—Michael R. Mansen
(74) *Attorney, Agent, or Firm*—Edward W. Goodman (57) ABSTRACT

In the case of a magnetic-tape apparatus (1) and/or in the case of a pressure-roller unit (65), a pressure-roller spindle (55) and a bearing part (60), which surrounds the pressure-roller spindle (55) and can be rotated relative to the pressure-roller spindle (55), for rotatably bearing a pressure roller (29) are provided. The bearing part (60) having a first bearing surface (63) which is formed by a toroidal surface and cooperates with a second bearing surface (64) likewise formed by a toroidal surface. The two bearing surfaces (63, 64) formed in each case by a toroidal surface permitting a wobbling movement of the pressure roller (29), and the two bearing surfaces (63, 64) being held lying against one another without play, and of these two bearing surfaces (63, 64) at least one bearing surface (63) being provided in a compliant fashion in radial directions relative to the other bearing surface (64).

20 Claims, 7 Drawing Sheets

MAGNETIC-TAPE APPARATUS WITH A PRESSURE-ROLLER DEVICE AND PRESSURE-ROLLER UNIT

The invention relates to a magnetic-tape apparatus having a tape-drive shaft which can be driven in a rotating fashion to drive a magnetic tape, and having a pressure-roller device, in the case of which a substantial feature is provided by virtue of the fact that the pressure roller is mounted with the aid of two bearing surfaces which are formed in each case by a toroidal surface and which give the pressure roller freedom of movement for matching the axial direction of the pressure roller to the axial direction of the tape-drive shaft.

The invention further relates to a pressure-roller unit, in which a substantial feature consists in that the pressure roller is mounted with the aid of two bearing surfaces each formed by a toroidal surface, which bearing surfaces of the pressure roller give freedom of movement for matching the axial direction of the pressure roller to a desired direction.

Reference may be made to patent document U.S. Pat. No. 5,452,833 A in the connection set forth above in the first paragraph and the second paragraph. This patent document discloses a magnetic-tape apparatus having a pressure-roller device and a pressure-roller unit, the pressure roller being mounted with the aid of two toroidal surfaces. In the design disclosed in patent document U.S. Pat. No. 5,452,833 A, a bearing part for rotatably bearing the bearing roller is rotatably held on a pressure-roller spindle, and the bearing part is thereby provided with an external toroidal surface which cooperates with an internal toroidal surface which is provided in a bearing sleeve located in the interior of the pressure roller. In this case, the design is made such that a sufficiently large play is provided between the two toroidal surfaces, that is to say between the external toroidal surface of the bearing part and the internal toroidal surface of the pressure roller, which must necessarily be the case with this solution, because without this play a matching movement, that is to say a wobbling movement of the pressure roller relative to the bearing part would not be possible at all. It may be expressly pointed out here that in the case where two toroidal surfaces provided as bearing surfaces are provided in virtually rigid bodies and thereby lie against one another virtually without play, no wobbling movements at all are possible, but only a pure rotational movement. The reason for this lies in the geometry of toroidal surfaces. In the known design, sufficiently large play is thereby deliberately provided between the two toroidal surfaces provided as bearing surfaces, in order to permit a wobbling movement of the pressure roller.

The design described in patent document U.S. Pat. No. 5,452,833 A has proved to be an acceptably functioning solution during the driving of a magnetic tape with the aid of the tape-drive shaft and the pressure roller. In the case of the known solution, however, it has emerged that at each instant at which the pressure roller is brought into operational connection with the tape-drive shaft the play present between the two toroidal surfaces and, to be precise in this case, the axial component of this play, constitute a problem, specifically because at the instant when the pressure roller presses against the tape-drive shaft an axial movement of the pressure roller comes about, admittedly only slight but occurring nevertheless, which axial movement has, or can have the consequence that the tape present between the pressure roller and the tape-drive shaft is also moved slightly in the axial direction of the tape-drive shaft, that is to say transverse to the tape longitudinal direction, and this has a disadvantageous effect on the scanning operation of the magnetic tape. This problem appears in a disturbing way in particular whenever the magnetic tape is driven in what is termed the start-stop mode, in which a continuously repeating alternation between pressure from the pressure roller against the tape drive roller and lifting of the pressure roller from the tape-drive shaft takes place in short time intervals.

The invention has set itself the object of removing the problems set forth above in a structurally simple way and with simple means, and of implementing an improved magnetic-tape apparatus and an improved pressure-roller unit.

In order to achieve the object set forth above, in the case of a magnetic-tape apparatus according to the invention features according to the invention are provided such that a magnetic-tape apparatus according to the invention can be defined in the following given way, specifically:

A magnetic-tape apparatus having a tape-drive shaft which can be driven in a rotating fashion to drive a magnetic tape, and having a pressure-roller device which has a pressure roller, that can be pressed against the tape-drive shaft, and an adjustable pressure-roller carrier, and a pressure-roller spindle borne by the pressure-roller carrier, and a bearing part, which surrounds the pressure-roller spindle and can be rotated relative to the pressure-roller spindle, for rotatably bearing the pressure roller, the bearing part having a first bearing surface which is formed by a toroidal surface, and in which the first bearing surface of the bearing part is operationally connected to a second bearing surface of a counterbearing which is likewise formed by a toroidal surface, and in which the two bearing surfaces, formed in each case by a toroidal surface, of the pressure roller give freedom of movement for matching the axial direction of the pressure roller to the axial direction of the tape-drive shaft, and in which the two bearing surfaces are held lying against one another without play, and in which of these two bearing surfaces at least one bearing surface is provided in a compliant fashion in radial directions relative to the other bearing surface.

In order to achieve the object set forth above, in the case of a pressure-roller unit in accordance with the invention features according to the invention are further provided such that a pressure-roller unit in accordance with the invention can be defined in the way specified below, specifically:

A pressure-roller unit for a magnetic-tape apparatus having a drive shaft which can be driven in a rotating fashion to drive a magnetic tape, which magnetic tape can be pressed against the tape-drive shaft with the aid of a pressure roller of the pressure-roller unit, which pressure-roller unit has a pressure roller and a pressure-roller spindle and a bearing part, which surrounds the pressure-roller spindle and can be rotated relative to the pressure-roller spindle, for rotatably bearing the pressure roller, in which the bearing part has a first bearing surface which is formed by a toroidal surface, and in which the first bearing surface of the bearing part is operationally connected to a second bearing surface of a counterbearing which is likewise formed by a toroidal surface, and in which the two bearing surfaces, formed in each case by a toroidal surface, of the pressure roller give freedom of movement for matching the axial direction of the pressure roller to a desired direction, and in which the two bearing surfaces are held lying against one another without play, and in which of these two bearing surfaces at least one bearing surface is provided in a compliant fashion in radial directions relative to the other bearing surface.

The result of the provision of the features in accordance with the invention is that in a structurally simple and space saving and cost effective way the pressure roller can be adapted both smoothly and quickly in terms of position to the alignment of the tape-drive shaft of a magnetic-tape apparatus according to the invention, and that it is also thereby ensured, however, that the pressure roller is held with the aid of the bearing surfaces formed by toroidal surfaces in an accurate and always reproducible starting position, it thereby being advantageously achieved that when the pressure roller is pressed against the tape-drive shaft the pressure roller cannot be adjusted axially relative to the tape-drive shaft, and therefore the undesired phenomena caused by such an axial readjustment are reliably avoided.

In the case of a magnetic-tape apparatus in accordance with the invention, it is possible to provide a design which corresponds to the design disclosed in patent document U.S. Pat. No. 5,452,833 A to the effect that a bearing part provided with an external toroidal surface and a bearing sleeve provided with an internal toroidal surface and located in the interior of the pressure roller are provided, although in accordance with the invention present here the two toroidal surfaces are held lying against one another without play and at least one of the two toroidal surfaces is provided in a compliant fashion in radial directions relative to the other of the two toroidal surfaces. It has proved particularly advantageous, however, when the design is as claimed in claim 2 or claim 12. This has proved to be particularly advantageous with regard to a design which is structurally very simple and satisfactory with a few components.

In an embodiment in accordance with the invention, it has proved, furthermore, to be particularly advantageous when the features as claimed in claim 3 or with claim 13 are additionally provided. Such a design offers the advantage that such a sleeve can be implemented as a plastic part in a simple way.

In an embodiment in accordance with the invention having a sleeve as described above, it has proved to be advantageous when the features as claimed in claim 4 or claim 14 are additionally provided. In this case, the compliance is implemented in the region of the counterbearing surface, specifically in a very simple way.

In an embodiment in accordance with the invention, it has proved to be particularly advantageous, however, when the features as claimed in claim 5 or claim 15 are additionally provided. Such a design is distinguished by a particular simplicity and, however, additionally also by a high stability and long lasting reliability.

There are various solutions for implementing a bearing surface which is provided on the bearing part and compliant in radial directions. However, it has proved to be particularly advantageous when a design having the features as claimed in claim 6 or claim 16 is implemented in this context. Such a design can be implemented in a structurally simple way, specifically in particular using plastic technology.

In an embodiment having at least two bearing part sectors, it has proved to be particularly advantageous when the features as claimed in claim 7 or in accordance with claim 17 are additionally provided. Such a design has proved to be particularly favorable in practice.

In an embodiment as mentioned above, it has proved to be particularly advantageous when the features as claimed in claim 8 or claim 18 are additionally provided and/or the features as claimed in claim 9 or claim 19. This is advantageous with regard to the stablest possible holding and bearing of the pressure roller.

In an embodiment having three holding part sectors, it has further proved to be very advantageous when the features as claimed in claim 10 or claim 20 are additionally provided. Such an embodiment offers the advantage of effectively sealing the bearing region having the toroidal surfaces off from the outer region of the pressure roller.

The aspects set forth above and further aspects of the invention proceed from the examples of embodiment described below and are explained with the aid of these exemplary embodiments.

The invention is described further below with the aid of three examples of embodiment illustrated in the drawings, but the invention is not limited to them.

Figure 1:
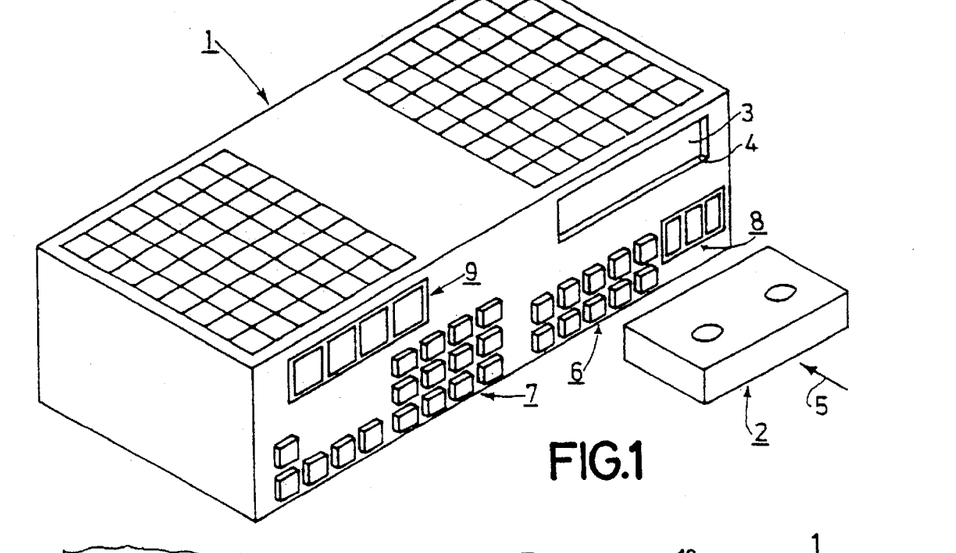
FIG. 1 shows a schematic in an oblique view from above of a magnetic-tape apparatus in accordance with an example of embodiment of the invention, into which it is possible to insert a cassette containing a magnetic tape.
Figure 2:
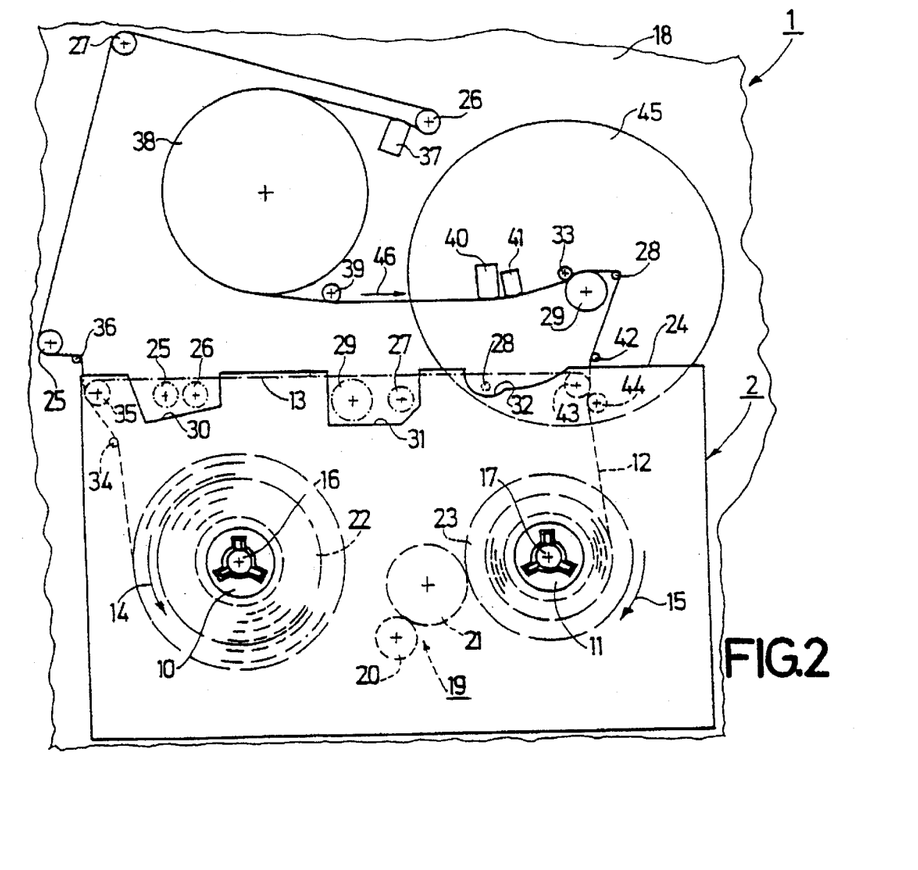
FIG. 2 shows a schematic plan view of a part of the apparatus in accordance with FIG. 1, which part includes a pressure-roller device.

FIGS. 1 and 2 illustrate a magnetic-tape apparatus 1 which is designed for recording and reproducing television signals and audio signals on a magnetic tape and is named apparatus 1 below, for brevity. The magnetic tape is accommodated in a cassette 2 which can be inserted manually into the apparatus 1 in the direction of an arrow 5 through an opening 4 which can be closed by a cover 3 which can be displaced inward. When the cassette 2 is inserted into the apparatus 1, the cassette 2 is introduced into an adjustable cassette receiver, which is not illustrated and with the aid of which the cassette 2, after being completely introduced into the apparatus 1, is lowered in a fashion substantially perpendicular to the cassette main walls of the cassette 2 into an operating position, illustrated schematically in FIG. 2, in the apparatus 1. The apparatus 1 has a first set 6 of operating keys in order to switch on operating modes of the apparatus 1. The apparatus 1 has a second set 7 of operating keys in order to program the apparatus 1 and to input further data. The apparatus 1 also has two display units 8 and 9 which serve to display register readings of a register for measuring the magnetic-tape usage and for displaying times of day.

As may be seen in FIG. 2, there are accommodated in the cassette 2 two neighboring winding spools 10 and 11 which can be driven in a rotating fashion and between which the magnetic tape 12 can run inside the cassette 2 along the course specified partly by a dashed and dotted line 13, and onto which the magnetic tape 12 can be wound, in a fashion corresponding to its respective direction of advance, optionally and in an opposite winding sense, as is specified by the arrows 14 and 15. In the case of the lowering of a cassette 2 into its operating position in the apparatus 1, two winding pins 16 and 17 are operationally connected to the winding spools 10 and 11 accommodated in the cassette 2, which pins are rotatably mounted in a mounting plate 18 of the apparatus 1. The two winding spools 10 and 11 mounted coaxially on the winding pins 16 and 17 can be driven in a rotating fashion by the winding pins 16 and 17. Provided for the purpose of driving the two winding pins 16 and 17 is a drive device 19, which is indicated only schematically in FIG. 2 and has a drive wheel 20, arranged in a stationary fashion in the apparatus 1 and capable of being driven by motor, and a drive wheel 21 which can be driven by said drive wheel and is held so that it can be adjusted parallel to the mounting plate 18, and which can optionally be brought circumferentially into driving connection with one of two winding pin wheels 22 and 23 which are arranged coaxially with the winding pins 16 and 17 and are connected in a rotationally secure fashion to the winding pins 16 and 17.

In the case of the lowering of the cassette 2 into its operating position in the apparatus 1, a cassette cover lid that is provided on the end face 24 of the cassette 2 but is not, however, illustrated in FIG. 2 is opened, as a result of which there are cleared in the end face 24 cassette openings through which the magnetic tape 12 accommodated in the cassette 2 can be guided out of the cassette 2. When the cassette 2 is lowered, four tape guides 25, 26, 27 and 28 and a pressure roller 29, these tape guides and the pressure roller in each case being in a rest position illustrated in FIG. 2 with dashed and dotted lines, enter three cutouts 30, 31 and 32 in the cassette 2, in which case they grip behind the magnetic tape 12 in the region of the course illustrated by the line 13. After the completed lowering of the cassette 2, the tape guides 25, 26, 27 and 28 can each be adjusted into their operating position illustrated by full lines in FIG. 2. Furthermore, the pressure roller 29 can be adjusted into an intermediate position (not illustrated in FIG. 2) in the vicinity of a tape-drive shaft 33. In this case, the magnetic tape 12 is guided out of the cassette 2 through the cassette openings in the end face 24 of the cassette 2. The pressure roller 29 can be adjusted from said intermediate position to its operating position which is illustrated in FIG. 2 by a full line and in which it presses the magnetic tape 12 against the tape-drive shaft 33. The pressure roller 29 is a constituent of a pressure-roller device which is explained below in more detail with the aid of FIG. 3.

After an adjustment of the tape guides 25, 26, 27 and 28 and of the pressure roller 29 into their operating positions, the magnetic tape 12 adopts the course illustrated in FIG. 2 by a full line. In this case, the magnetic tape 12 extends from the winding spool 10 to the winding spool 11 via two tape guides 34 and 35 included in the cassette 2, and via a tape tension sensing pin 36 and via the adjustable tape guides 25, 27 and 26 and via a fixed magnetic head 37 and a drum-shaped scanning unit 38 and a fixed tape guide 39 and two fixed magnetic heads 40 and 41 and the tape-drive shaft 33, against which the magnetic tape 12 is pressed by the pressure roller 29, and via the adjustable tape guide 28 and a fixed tape guide 42 and two further tape guides 43 and 44 included in the cassette 2.

The tape-drive shaft 33 is connected to a flywheel 45, and can optionally be driven by drive means (not illustrated) in one of two directions of rotation at a constant rotation speed. The magnetic tape 12 is driven in what is termed "normal advance" with the aid of the tape-drive shaft 33 and the pressure roller 29 in the direction of the arrow 46.

Figure 3:
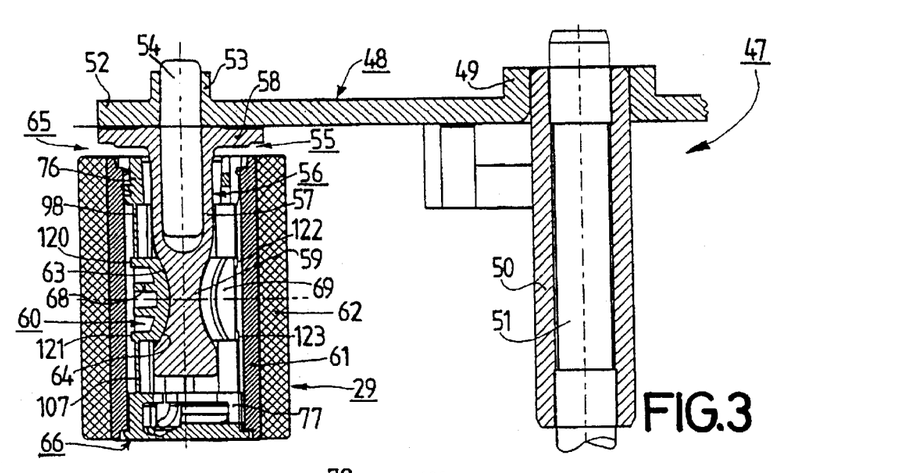
FIG. 3 shows a cross section of the pressure-roller device of the apparatus in accordance with FIGS. 1 and 2, which pressure-roller device has a pressure-roller unit in accordance with a first example of embodiment of the invention which includes a combination component which has a bearing part and two holding parts for the pressure roller.
Figure 4:
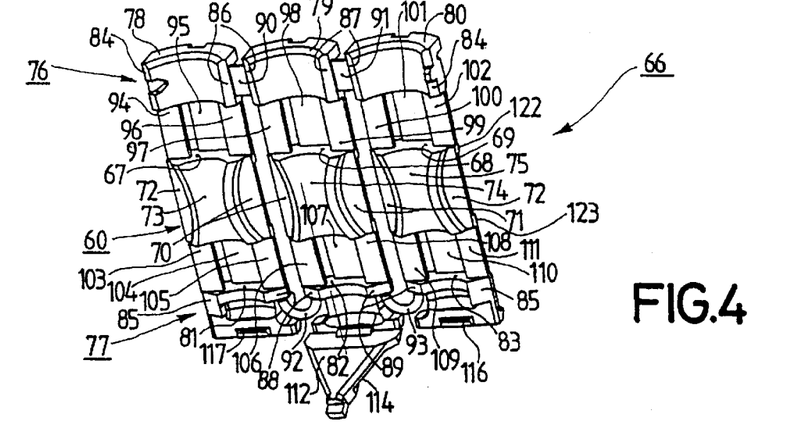
FIG. 4 shows an oblique view from above of the interior of the combination component of the pressure-roller device in accordance with FIG. 3, the combination component adopting an extended state.
Figure 5:
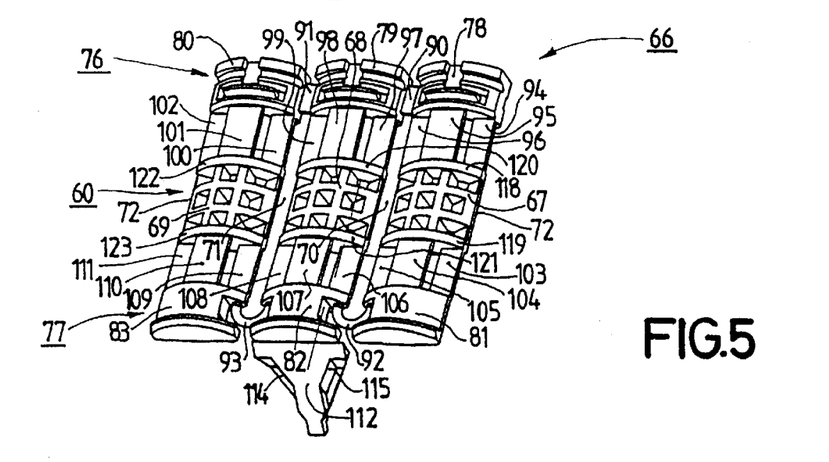
FIG. 5 shows an oblique view from below of the exterior of the combination component in accordance with FIG. 4, the combination component likewise adopting an extended state.
Figure 6:
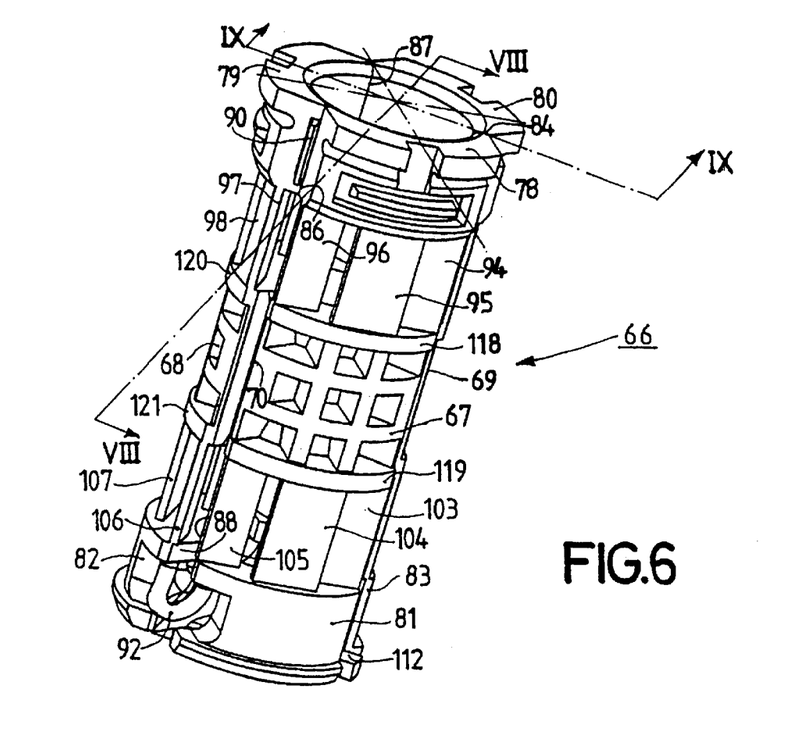
FIG. 6 shows an oblique view from above of the combination component in accordance with FIGS. 4 and 5 in its assembled state.
Figure 7:
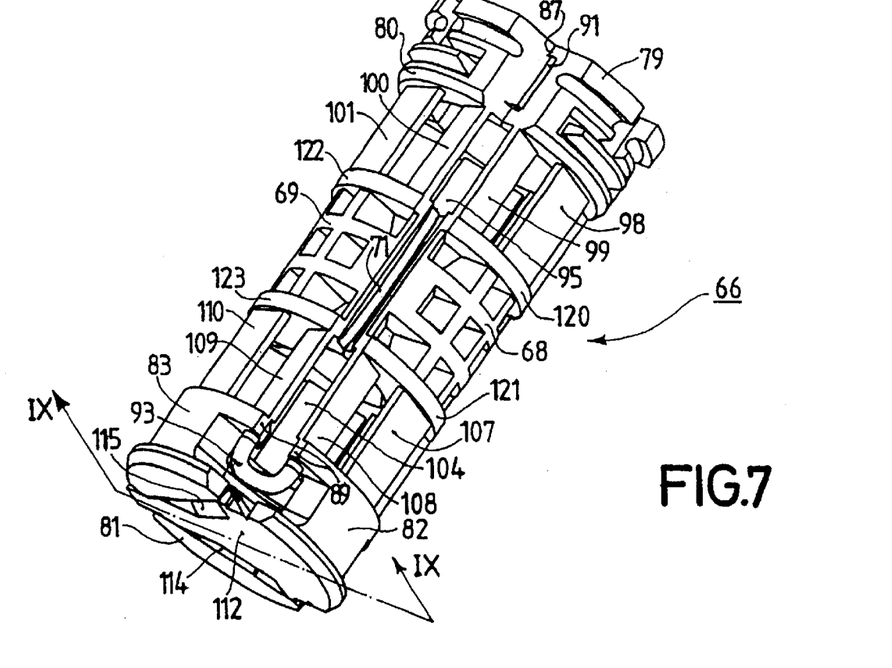
FIG. 7 shows an oblique view from below of the combination component in accordance with FIGS. 4, 5 and 6 in its assembled state.
Figure 8:
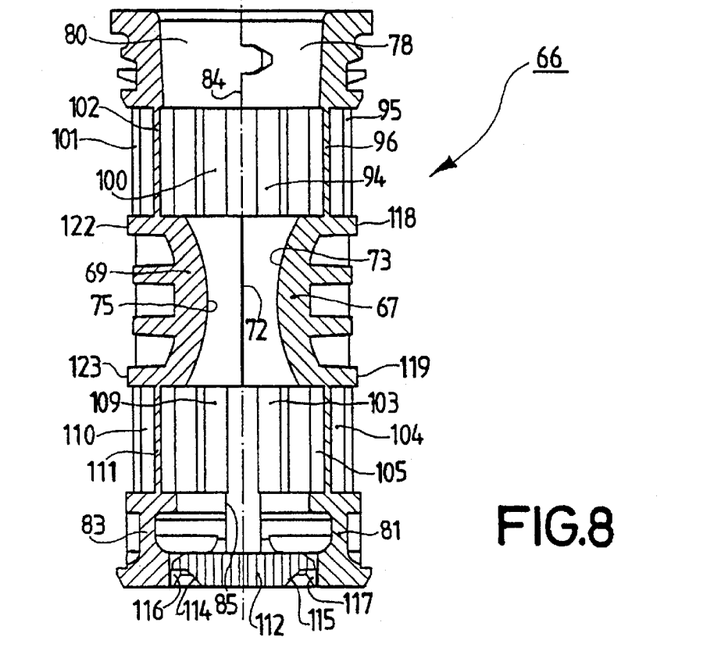
FIG. 8 shows the combination component in accordance with FIGS. 4 to 7 in a section along line VIII—VIII in FIG. 6.

As already mentioned, the pressure roller 29 is a constituent of a drive roller device 47 which is not further examined in FIG. 2. The drive roller device 47 is now described in more detail with the aid of FIG. 3. FIG. 3 illustrates the pressure-roller device 47 in an operating situation in which the pressure roller 29 is not pressed against the tape-drive shaft 33.

The pressure-roller device 47 has an adjustable pressure-roller carrier 48 which is formed in the present case by an adjustably held lever 48. The lever 48 has a bearing cylinder 49 which is mounted with the lever 48 on a bearing sleeve 50, the bearing cylinder 49 and consequently the lever 48 being connected in a rotationally secured fashion to the bearing sleeve 50. The bearing sleeve 50 is pushed onto a bearing pin 51 and can be rotated relative to the bearing pin 51. The bearing pin 51 is pressed into the mounting plate 18 and projects vertically from the mounting plate 18. The lever 48 is provided with a fastening cylinder 53 in the region of its free end 52. A steel spindle 54 is pressed into the fastening cylinder 53. The steel spindle 54 is a constituent of a pressure-roller spindle 55. In addition to the steel spindle 54, the pressure-roller spindle 55 also includes a sleeve 56 which consists of plastic. The sleeve 56 has a sleeve section 57 to which a disk-shaped sealing part 58 is connected at its end averted from the lever 48. The sleeve 55 is supported with the sealing part 58 on the lever 48. The sleeve 55 is provided with a sleeve head 59 at the end of the sleeve section 57 averted from the sealing part 58. The pressure-roller device 47 further has a bearing part 60 which surrounds the pressure-roller spindle 55 and can be rotated relative to the pressure-roller spindle 55 and which is provided for the purpose of bearing the pressure roller 29 rotatably, and in this case additionally of bearing it such that it can wobble. The pressure roller 29 comprises an inner pressure-roller sleeve 61 onto which a rubber coat 62 is vulcanized. The pressure-roller sleeve 61 is in the present case made of a plastic reinforced with carbon fiber. The pressure-roller sleeve 61 may, however, also be made of a plastic reinforced with glass fiber, or of metal.

The bearing part 60 has a first bearing surface 63, which is formed by a toroidal surface. The first bearing surface 63 of the bearing part 60 is operationally connected to a second bearing surface 64 of a counterbearing, which is likewise formed by a toroidal surface. The counterbearing is formed in this case by the sleeve head 59. The two bearing surfaces 63 and 64 are provided in this case in such a way that the two bearing surfaces 63 and 64 of the pressure roller 29, which are respectively formed by a toroidal surface, give freedom of movement for matching the axial direction of the pressure roller 29 to the axial direction of the tape-drive shaft 33.

It may further be mentioned that the pressure-roller spindle 55, which comprises the steel spindle 54 and the sleeve 56, and the pressure roller 29 together with its bearing part 60 form a pressure-roller unit 65 which can be produced as a separate component and can be connected once manufactured to the lever 48 provided as pressure-roller carrier 48, if this is desired.

In the case of the magnetic-tape apparatus 1 in accordance with FIGS. 1 and 2, and of the pressure-roller unit 65 of the pressure-roller device 47 in accordance with FIG. 3, the design is preferably made in such a way that the two bearing surfaces 63 and 64 formed in each case by a toroidal surface are held lying against one another without play, and that of the two bearing surfaces 63 and 64 respectively formed by a toroidal surface, in the present case one bearing surface 63, that is to say, the first bearing surface 63 provided on the bearing part 60, is provided in a compliant fashion in radial directions relative to the other bearing surface 64, that is to say, the second bearing surface 64, which is provided on the pressure-roller spindle 55, specifically on the sleeve head 59 of the sleeve 56. This provides the great advantage that because the pressure roller 29 is designed without play, it is held in a precisely defined rest position with the aid of the two bearing surfaces 63 and 64 designed as toroidal surfaces, specifically in a precisely defined rest position both in radial directions and in axial directions.

In the embodiment in accordance with FIG. 3, the bearing part 60 is connected to the pressure roller 29, and the first bearing surface 63 of the bearing part 60 is formed by an external toroidal surface. Furthermore, the second bearing surface 64 is provided on the pressure-roller spindle 55, and the second bearing surface 64 is formed by an internal toroidal surface. As already mentioned, the pressure-roller spindle 55 is formed using the sleeve 56 which is connected in a rotationally secured fashion to the pressure-roller carrier 48 via the steel spindle 54, and which has the sleeve head 59 which is provided with the second bearing surface 64.

In the case of the pressure-roller device 47, and thereby of the pressure-roller unit 65, a combination component 66 is provided whose design is described below in detail. The combination component 66 serves both to hold the pressure roller 29 and to bear the pressure roller 29 such that it can rotate and wobble, and therefore constitutes a particularly important constituent of the pressure-roller unit 56 or the pressure-roller device 47. The combination component 66 is illustrated in FIGS. 4 to 12 in the most varied ways.

The combination component 66 includes the bearing part 60 already mentioned above. The bearing part 60 comprises three bearing part sectors 67, 68 and 69, which are arcuate in the present case but need not necessarily be so. Three separation zones 70, 71, 72 running in axial directions and in radial directions are provided between the three bearing part sectors 67, 68 and 69, the two adjacent bearing part sectors 67, 68 or 68, 69 or 69, 67 being separated from one another in the case of each separation zone 70, 71 or 72. In this case, each bearing part sector 67, 68 and 69 is held in a radially adjustable fashion, something which is further examined in more detail below. As a consequence of the design of the bearing part 60 with the aid of the three arcuate bearing part sectors 67, 68 and 69, the situation is that the first bearing surface 63, that is to say the external toroidal surface 63, comprises three bearing surface sections 73, 74 and 75.

The pressure roller 29 is connected in its interior with two holding parts 76 and 77, specifically in such a way that the two holding parts 76 and 77 are introduced into the pressure-roller sleeve 61, the first holding part 76, lying closer to the sealing part 58 of the sleeve 56, being retained with an interference fit in the pressure-roller sleeve 61. The first holding part 76 is substantially of annular design, its inner region also being dimensioned such that the first holding part 76 is sufficiently liberated relative to the sleeve section 57 to permit a sufficiently large wobbling movement of the pressure roller 29. Both the first holding part 76 and the second holding part 77 comprise three holding part sectors 78, 79 and 80 or 81, 82 and 83 which are arcuate in the present case but need not necessarily be so.

Of these holding part sectors 78 to 83, the first holding part sector 78 and the third holding part sector 80 of the first holding part 76, and the first holding part sector 81 and the third holding part sector 83 of the second holding part 77 adjoin one another in the region of a separation zone 84 or 85 running in axial directions or in radial directions. The two holding part sectors 78, 80 or 81, 83 adjoining the relevant separation zone 84, 85 can be separated from one another to each of these two separation zones 84 and 85.

Furthermore, in the case of the combination component 66 the design is made with reference to the holding part sectors 78, 79, 80 or 81, 82, 83 such that the first holding part sector 78 and the second holding part sector 79 and the second holding part sector 79 and the third holding part sector 80 of the first holding part 76, as well as the first holding part sector 81 and the second holding part sector 82 and the second holding part sector 82 and the third holding part sector 83 of the second holding part 77 adjoin one another in the region of two hinge zones 86 and 87 or 88 and 89 running in axial directions and in radial directions, and are connected in the region of these hinge zones 86 and 87 or 88 and 89 so that they can be swiveled relative to one another and are inseparably connected to one another. A plate-shaped flexible web 90 or 91 running in the circumferential direction is provided for this purpose in each of the two hinge zones 86 and 87. Furthermore, a U-shaped bow 92 or 93, likewise extending in the circumferential direction, is provided for this purpose in each of the two hinge zones 88 and 89.

As may be seen from FIGS. 3 to 9, a bearing part sector 67, 68, 69 is arranged lying opposite each holding part sector 78, 79, 80 or 81, 82, 83 in axial directions. In this case, each holding part sector 78, 79, 80 or 81, 82, 83 is connected to a bearing part sector 67, 68, 69 lying opposite in an axial direction by means in each case of three webs 94, 95, 96 or 97, 98, 99 or 100, 101, 102 or 103, 104, 105 or 106, 107, 108 or 109, 110, 111 which are designed non-compliantly in axial directions and are designed in an elastically compliant fashion transverse to the axial directions. As a result of the provision of the webs 94 to 111, the bearing part sectors 67, 68 and 69 can be adjusted in radial directions, and this is imperative for the mode of operation, because only the adjustability of the bearing part sectors 67, 68 and 69 permits a matching movement, specifically a wobbling movement, between the external toroidal surface 63 and the internal toroidal surface 64, and thus a wobbling movement of the pressure roller 29.

The assembly of the pressure-roller device 47 is examined briefly in more detail below. The steel spindle 54 is pressed into the lever 48, provided as pressure-roller carrier 48, in order to implement the pressure-roller device 47. Subsequently, the sleeve 46 is pushed onto the steel spindle 54, and thereby brought to stop against the lever 48, an interference fit being implemented between the steel spindle 54 and the sleeve 56. Subsequently, the combination component 66, initially in an extended state, is laid around the sleeve 56, specifically in such a way that the bearing part sectors 67, 68 and 69 come to lie in the region of the internal toroidal surface 64 of the sleeve 56, and the first holding part 76 comes to lie next to the sealing part 58 of the sleeve 56. Subsequently, the pressure-roller sleeve 61 together with the rubber coat 62 is pushed onto the combination component 66 held in its hollow cylindrical state in accordance with FIGS. 6 to 12, a closure cap 112, provided in the region of the second holding part 77, of the combination component 66 still being in its non-closed state, something which is important because this is a precondition for it to be possible to compress the second holding part 77 in radial directions during guidance through the pressure-roller sleeve 61, and consequently for it to be possible to be pushed through the pressure-roller sleeve 61. The pressure-roller sleeve 61 is pushed so far onto the combination component 66 that the situation illustrated in FIG. 3 is reached. In this situation, a press fit is implemented between the first holding part 76 and the pressure-roller sleeve 61. With the closure cap 112 still open, a connection between the second holding part 77 and the pressure-roller sleeve 61, which is not fixed in radial directions, is firstly provided in the region of the second holding part 77.

Figure 9:
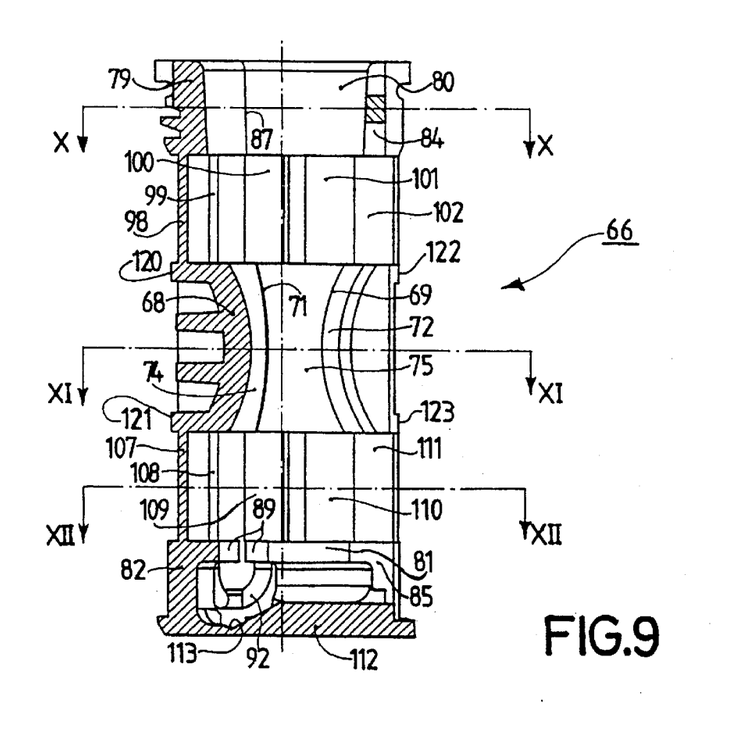
FIG. 9 shows the combination component in accordance with FIGS. 4 to 8 in a section along lines IX—IX in FIGS. 6 and 7.
Figure 13:
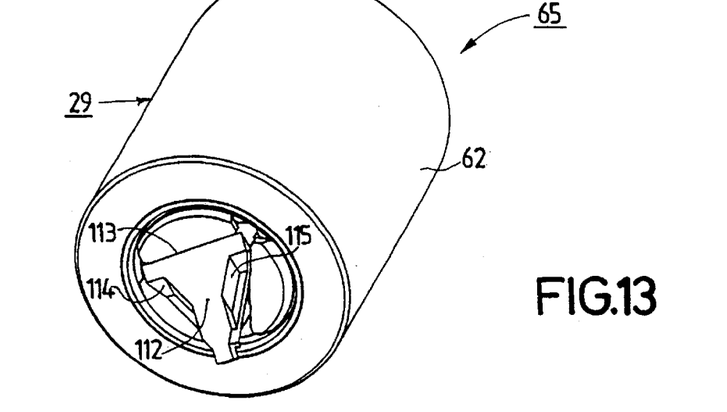
FIG. 13 shows an oblique view from below of the pressure-roller unit, which is a constituent of the pressure-roller device in accordance with FIG. 3, a closure cap of the combination component of the pressure-roller unit being in a position that is not yet closed.
Figure 14:
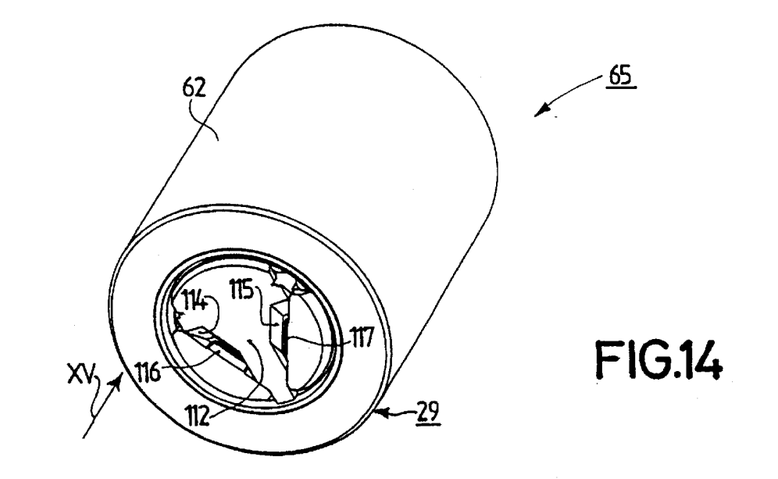
FIG. 14 shows in a similar way to FIG. 13 the pressure-roller unit in accordance with FIG. 13, the closure cap being in its closed position.
Figure 15:
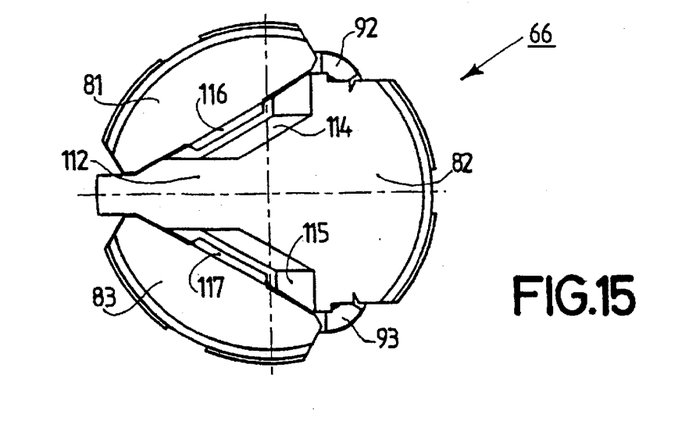
FIG. 15 shows a view from below corresponding to the arrow XV in FIG. 14 of the combination component of the pressure-roller unit in accordance with FIGS. 13 and 14.

With reference to the closure cap 112, it may be mentioned at this juncture that the closure cap 112 is flexibly connected to the second holding part sector 82 of the second holding part 77, specifically via a film hinge 113 that may be seen from FIG. 9. The closure cap 112 has two cutouts 114 and 115 which are provided for the purpose of respectively receiving a latching hook 116 or 117, the first latching hook 116 projecting from the third holding part sector 83 of the second holding part 77, and the second latching hook 117 projecting from the first holding part sector 81 of the second holding part 77. After the pressure-roller sleeve 61 has been pushed completely onto the combination component 66, thus producing the situation illustrated in FIG. 3, by being pushed down in an axial direction the closure cap 112 is brought into the position that is illustrated in FIG. 3 and in which the latching hooks 116 and 117 are latched into the cutouts 114 and 115 in the closure cap 112, the result being that the closure cap 112 is held in a self-closed connection with the aid of the two holding part sectors 81 and 83, which adjoin the holding part sector 82 that is flexibly connected to the closure cap 112. This then results in the creation of a connection, fixed in radial directions, between the second holding part 77 and the pressure-roller sleeve 61. Reference may also still be made to FIGS. 13, 14 and 15 for the closure cap 112 and its open state as well as its closed state.

The mode of operation of the embodiment explained above is still to be described below. When the pressure roller 29 is pressed with the aid of the adjustable pressure-roller carrier 48 against the tape-drive shaft 33, the result of this is that the rubber coat 62 is supported on the tape-drive shaft 33. As a result, in a fashion following one another, alternately each of the three bearing part sectors 67, 68, 69 supported with the aid of arcuately running support ribs 118, 119 or 120, 121 or 122, 123, provided on the outsides of these bearing part sectors, is supported in that region of the pressure-roller sleeve 61 which is opposite the tape-drive shaft 33. This leads to a force-closed connection between the pressure-roller spindle 55 and the pressure roller 29, such that the pressure roller is pressed against the tape-drive shaft 33 with the desired contact pressure. It is ensured thereby with the aid of the resilient webs 94 to 111 that all three bearing part sectors 67, 68, 69 with their bearing surface sections 73, 74 and 75 always remain held bearing against the second bearing surface 64 such that an interaction without play is always ensured between the two bearing surfaces 63 and 64.

Figure 10:
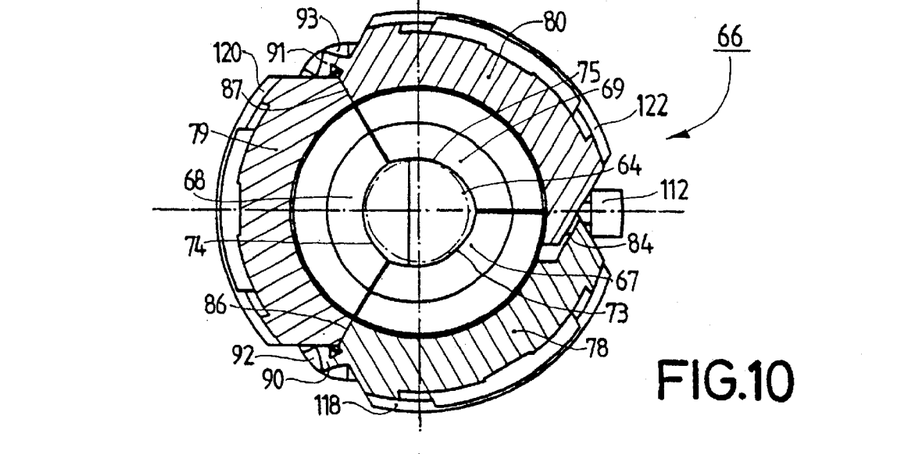
FIG. 10 shows the combination component in accordance with FIGS. 4 to 9 in a section in accordance with line X—X in FIG. 9.
Figure 11:
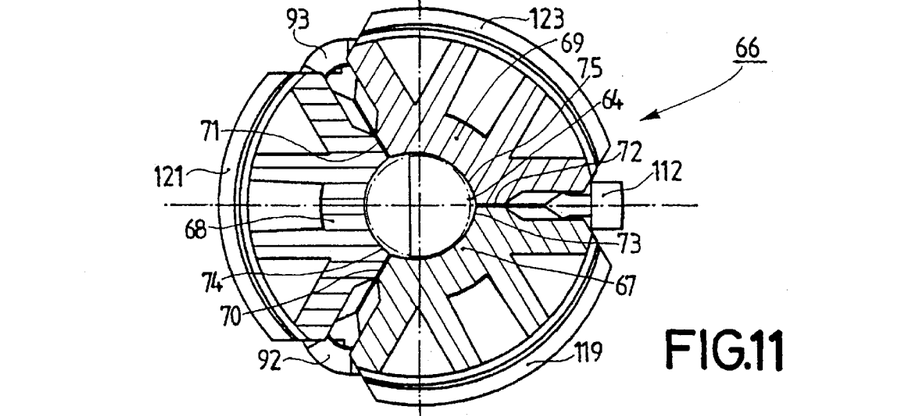
FIG. 11 shows the combination component in accordance with FIGS. 4 to 10 in a section in accordance with line XI—XI in FIG. 9.
Figure 12:
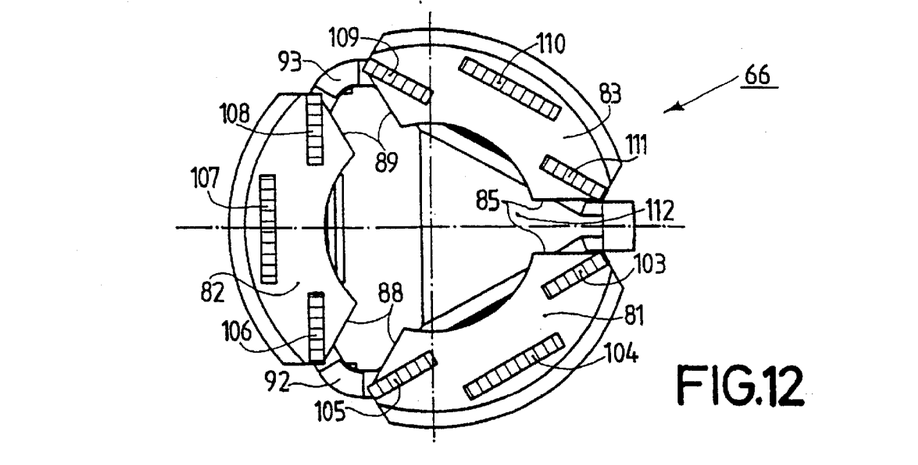
FIG. 12 shows the combination component in accordance with FIGS. 4 to 11 in a section along line XII—XII in FIG. 9.

Reference may further be made with the aid of FIGS. 10 and 11 to the following situation, specifically that the radius of the bearing surface sections 73, 74 and 75 which runs perpendicular to the pressure-roller spindle 55 is greater than the radius of the sleeve head 59 in the apex region of the internal toroidal surface 64, which is specified with a dashed and dotted line in FIGS. 10 and 11. In the case of a solution actually implemented in the course of the development of the embodiment described above, the diameter of the sleeve head 59 in the region of the apex of the toroidal surface 64 is selected as 2.0 mm, the radii of the bearing surface sections (toroidal surface section) 73, 74 and 75 running perpendicular to the pressure-roller spindle 55 being selected as 1.15 mm in each case.

Figure 16:
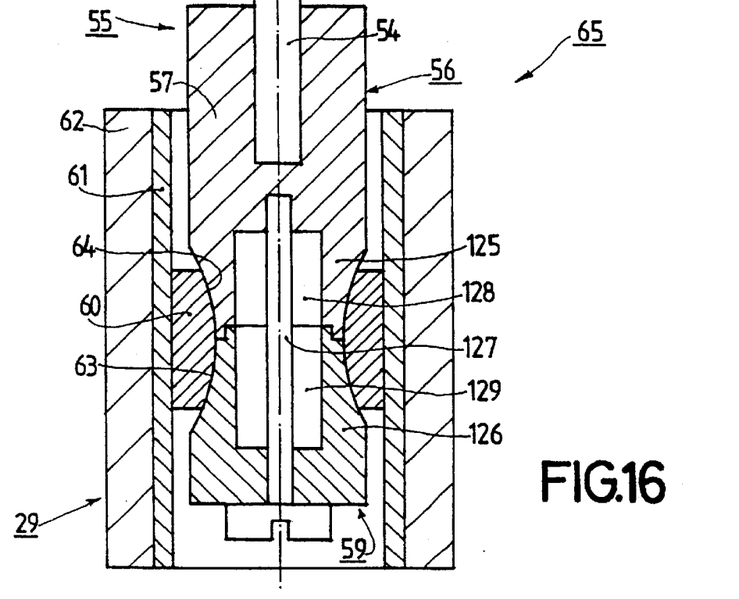
FIG. 16 shows a cross section of a pressure-roller unit in accordance with a second example of embodiment of the invention.

A second example of embodiment of a pressure-roller unit 65 is illustrated schematically in FIG. 16. The essential difference between this pressure-roller unit 65 and the pressure-roller unit 65 described with the aid of FIGS. 3 to 15 consists in that in the case of the pressure-roller unit 65 in accordance with FIG. 16 the compliance of a bearing surface is implemented in radial directions in the region of the pressure-roller spindle 55, specifically in the region of the sleeve head 59 of the sleeve 56 of the pressure-roller spindle 55.

In the present case, the sleeve head 59 is designed in a divided form, such that the sleeve head 59 comprises a first sleeve head section 125 and a second sleeve head section 126. The second sleeve head section 126 is connected with the aid of a screw 127 to the first sleeve head section 125 and to the remaining part of the sleeve 56. The sleeve head 59 is of hollow design in this case in its interior and in the axial level region of the second bearing surface 65, this being achieved by providing one cutout 128 or 129 each both in the first sleeve head section 125 and in the second sleeve head section 126. This hollow design of the sleeve head 59 in its interior and in the axial level region of the second bearing surface 64 results in a compliance of the second bearing surface 64 in radial directions so as to enable a wobbling movement, between the two bearing surfaces 63 and 64, which are held lying against one another without play, in order to be able to match the alignment of the pressure roller 29 to a desired direction, specifically to the axial direction of a tape-drive shaft, in which case upon the occurrence of such a wobbling movement a radial deflection of the internal toroidal surface 64 in the direction of the cutouts 128 and 129 occurs.

Figure 17:
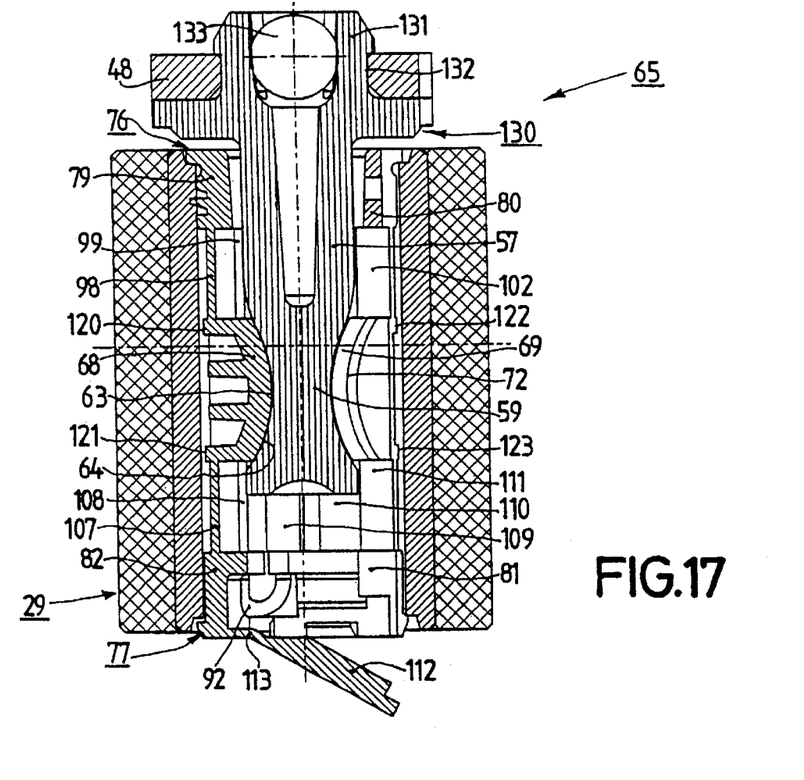
FIG. 17 shows in a similar way to FIG. 16 a pressure-roller unit in accordance with a third example of embodiment of the invention.

A third example of embodiment of a drive-roller unit 65 is illustrated in FIG. 17. In the case of this pressure-roller unit 65, the essential difference from the pressure-roller unit 65 in accordance with FIG. 3 consists in that the pressure-roller spindle 55 is implemented without a steel spindle 54, and therefore consists only of a sleeve 130 which is provided with a hollow cylindrical extension 131 which is guided through a bore 132 in the pressure-roller carrier 48 and, after being guided through, is fixed with the aid of a fixing ball 133 pressed into its interior.

It may be mentioned with reference to a combination component 66 as described above that it is also possible to provide more than three bearing part sectors and holding part sectors in the case of such a combination component. It may further be mentioned that in the case of the combination component 66 described above, the webs provided between the bearing part sectors and the holding part sectors resemble leaves, that is to say leaf springs, in design, although this need not necessarily be the case, because these webs can also resemble rods, that is to say rod springs, in design.

What is claimed is:

1. A magnetic-tape apparatus (1) having a tape-drive shaft (33) which can be driven in a rotating fashion to drive a magnetic tape (12), and having a pressure-roller device (47) which has a pressure roller (29), that can be pressed against the tape-drive shaft (33), and an adjustable pressure-roller carrier (48), and a pressure-roller spindle (55) borne by the pressure-roller carrier (48), and a bearing part (60), which surrounds the pressure-roller spindle (55) and can be rotated relative to the pressure-roller spindle (55), for rotatably bearing the pressure roller (29), the bearing part (60) having a first bearing surface (63) which is formed by a toroidal surface, and in which the first bearing surface (63) of the bearing part (60) is operationally connected to a second bearing surface (64) of a counterbearing (59) which is likewise formed by a toroidal surface, and in which the two bearing surfaces (63, 64), formed in each case by a toroidal surface, of the pressure roller (29) give freedom of movement for matching the axial direction of the pressure roller (29) with the axial direction of the tape-drive shaft (33), and in which the two bearing surfaces (63, 64) are held lying against one another without play, and in which of these two bearing surfaces (63, 64) at least one bearing surface (63; 64) is provided in a compliant fashion in radial directions relative to the other bearing surface (64; 63).

2. A magnetic-tape apparatus (1) as claimed in claim 1, in which the bearing part (60) is connected to the pressure roller (29), and in which the first bearing surface (63) of the bearing part (60) is formed by an external toroidal surface, and in which the second bearing surface (64) is provided on the pressure-roller spindle (55), and in which the second bearing surface (64) is formed by an internal toroidal surface.

3. A magnetic-tape apparatus (1) as claimed in claim 2, in which the pressure-roller spindle (55) is formed by using a sleeve (56) connected to the pressure-roller carrier (48) in a rotationally secure fashion, and in which the sleeve (56) has a sleeve head (59) which is provided with the second bearing surface (64).

4. A magnetic-tape apparatus (1) as claimed in claim 3, in which the sleeve head (59) is of hollow design in its interior and in the axial level region of the second bearing surface (64) in order to achieve compliance of the second bearing surface (64) in radial directions.

5. A magnetic-tape apparatus (1) as claimed in claim 2, in which the second bearing surface (64) provided on the pressure-roller spindle (55) is provided in a non-compliant fashion in radial directions, and in which the first bearing surface (63) provided on the bearing part (60) is provided in a compliant fashion in radial directions.

6. A magnetic-tape apparatus (1) as claimed in claim 5, in which the bearing part (60) comprises at least two bearing part sectors (67, 68, 69), between which bearing part sectors (67, 68, 69) there are provided at least two separation zones (70, 71, 72) running substantially in axial directions and in radial directions, the two adjoining bearing part sectors (67, 68 or 68, 69 or 69, 67) being separated from one another in the case of each separation zone (70, 71, 72), and in which each bearing part sector (67, 68, 69) is held in a radially adjustable fashion.

7. A magnetic-tape apparatus (1) as claimed in claim 6, in which the pressure roller (29) is connected in its interior to at least one holding part (76, 77) which comprises at least two holding part sectors (78, 79, 80, 81, 82, 83), and in which the at least two holding part sectors (78, 79, 80, 81, 82, 83) adjoin one another in the region of a separation zone (84, 85) running at least substantially in axial directions and in radial directions, in which separation zone (84, 85) the two holding part sectors (78, 80, 81, 83) adjoining the separation zone (84, 85) are separable from one another, and in which the at least two holding part sectors (78, 79, 80, 81, 82, 83) are pivotable relative to one another and inseparably connected to one another in the region of at least one hinge zone (86, 87, 88, 89) running in axial directions and in radial directions, and in which a bearing part sector (67, 68, 69) lies opposite each holding part sector (78, 79, 80, 81, 82, 83) in an axial direction, and in which each holding part sector (78, 79, 80, 81, 82, 83) is connected to a bearing part sector (67, 68, 69) lying opposite in an axial direction, by means of at least an elastic web (94, 95, 96, 97, 98, 99, 100, 101, 102, 103, 104, 105, 106, 107, 108, 109, 110, 111) which is of non-compliant design in axial directions and compliant design in at least one direction transverse to the axial directions.

8. A magnetic-tape apparatus (1) as claimed in claim 7, in which the pressure roller (29) is connected in its interior to two holding parts (76, 77) of which each comprises at least two holding part sectors (78, 79, 80, 81, 82, 83) and in which the bearing part (60) lies between the two holding parts (76, 77).

9. A magnetic-tape apparatus (1) as claimed in claim 7, in which the bearing part (60) comprises three bearing part sectors (67, 68, 69) and in which the at least one holding part (76, 77) comprises three holding part sectors (78, 79, 80, 81, 82, 83).

10. A magnetic-tape apparatus (1) as claimed in claim 9, in which a holding part sector (82) is flexibly connected to a closure cap (112) and in which the closure cap (112) is held in interlocking connection with the two holding part sectors (81, 83) which are adjacent to the holding part sector (82) flexibly connected to the closure cap (112).

11. A pressure-roller unit (66) for a magnetic-tape apparatus (1) having a tape-drive shaft (33) which can be driven in a rotating fashion to drive a magnetic tape (12), which magnetic tape (12) can be pressed against the tape-drive shaft (33) with the aid of a pressure roller (29) of the pressure-roller unit (66), which pressure-roller unit (66) has a pressure roller (29) and a pressure-roller spindle (55) and a bearing part (60) which surrounds the pressure-roller spindle (55) and can be rotated relative to the pressure-roller spindle (55), for rotatably bearing the pressure roller (29), in which the bearing part (60) has a first bearing surface (63) which is formed by a toroidal surface, and in which the first bearing surface (63) of the bearing part (60) is operationally connected to a second bearing surface (64) of a counterbearing (59) which is likewise formed by a toroidal surface, and in which the two bearing surfaces (63, 64), formed in each case by a toroidal surface, of the pressure roller (29) give freedom of movement for matching the axial direction of the pressure roller (29) with a desired direction, and in which the two bearing surfaces (63, 64) are held lying against one another without play, and in which of these two bearing surfaces (63, 64) at least one bearing surface (63; 64) is provided in a compliant fashion in radial directions relative to the other bearing surface (64; 63).

12. A pressure-roller unit (66) as claimed in claim 11, in which the bearing part (60) is connected to the pressure roller (29), and in which the first bearing surface (63) of the bearing part (60) is formed by an external toroidal surface, and in which the second bearing surface (64) is provided on the pressure-roller spindle (55), and in which the second bearing surface (64) is formed by an internal toroidal surface.

13. A pressure-roller unit (66) as claimed in claim 12, in which the pressure-roller spindle (55) is formed by using a sleeve (56), and in which the sleeve (56) has a sleeve head (59) which is provided with the second bearing surface (64).

14. A pressure-roller unit (66) as claimed in claim 13, in which the sleeve head (59) is of hollow design in its interior and in the axial level region of the second bearing surface (64) in order to achieve compliance of the second bearing surface (64) in radial directions.

15. A pressure-roller unit (66) as claimed in claim 12, in which the second bearing surface (64) provided on the pressure-roller spindle (55) is provided in a non-compliant fashion in radial directions, and in which the first bearing surface (63) provided on the bearing part (60) is provided in a compliant fashion in radial directions.

16. A pressure-roller unit (66) as claimed in claim 15, in which the bearing part (60) comprises at least two bearing part sectors (67, 68, 69), between which bearing part sectors (67, 68, 69) there are provided at least two separation zones (70, 71, 72) running substantially in axial directions and in radial directions, the two adjoining bearing part sectors (67, 68 or 68, 69 or 69, 67) being separated from one another at each separation zone (70, 71, 72), and in which each bearing part sector (67, 68, 69) is held in a radially adjustable fashion.

17. The pressure-roller unit (66) as claimed in claim 16, in which the pressure roller (29) is connected in its interior to at least one holding part (76, 77) which comprises at least two holding part sectors (78, 79, 80, 81, 82, 83), and in which the at least two holding part sectors (78, 79, 80, 81, 82, 83) adjoin one another in the region of a separation zone (84, 85) running at least substantially in axial directions and in radial directions, in which separation zone (84, 85) the two holding part sectors (78, 80, 81, 83) adjoining the separation zone (84, 85) are separable from one another, and in which the at least two holding part sectors (78, 79, 80, 81, 82, 83) are pivotable relative to one another and inseparably connected to one another in the region of at least one hinge zone (86, 87, 88, 89) running in axial directions and in radial directions, and in which a bearing part sector (67, 68, 69) lies opposite each holding part sector (78, 79, 80, 81, 82, 83) in an axial direction, and in which each holding part sector (78, 79, 80, 81, 82, 83) is connected to a bearing part sector (67, 68, 69) lying opposite in an axial direction by means of at least an elastic web (94, 95, 96, 97, 98, 99, 100, 101, 102, 103, 104, 105, 106, 107, 108, 109, 110, 111) which is of non-compliant design in axial directions and compliant design in at least one direction transverse to the axial directions.

18. A pressure-roller unit (66) as claimed in claim 17, in which the pressure roller (29) is connected in its interior to two holding parts (76, 77), of which each comprises at least two holding part sectors (78, 79, 80, 81, 82, 83), and in which the bearing part (60) lies between the two holding parts (76, 77).

19. A pressure-roller unit (66) as claimed in claim 17, in which the bearing part (60) comprises three bearing part sectors (67, 68, 69), and in which the at least one holding part (76, 77) comprises three holding part sectors (78, 79, 80, 81, 82, 83).

20. A pressure-roller unit (66) as claimed in claim 19, in which a holding part sector (82) is flexibly connected to a closure cap (112), and in which the closure cap (112) is held in interlocking connection with the two holding part sectors (81, 83) which are adjacent to the holding part sector (82) flexibly connected to the closure cap (112).

* * * * *